United States Patent
Williams

(10) Patent No.: US 9,880,190 B2
(45) Date of Patent: Jan. 30, 2018

(54) MONITORING THE STRUCTURAL HEALTH OF COLUMNS

(71) Applicant: THE ALUMINIUM LIGHTING COMPANY LTD, Port Talbot (GB)

(72) Inventor: Craig Thomas Williams, Swansea (GB)

(73) Assignee: THE ALUMINIUM LIGHTING COMPANY LTD, Port Talbot (GB)

(*) Notice: Subject to any disclaimer, the term of this patent is extended or adjusted under 35 U.S.C. 154(b) by 0 days.

(21) Appl. No.: 15/322,090

(22) PCT Filed: Jun. 22, 2015

(86) PCT No.: PCT/GB2015/000191
§ 371 (c)(1),
(2) Date: Dec. 23, 2016

(87) PCT Pub. No.: WO2016/001614
PCT Pub. Date: Jan. 7, 2016

(65) Prior Publication Data
US 2017/0138978 A1    May 18, 2017

(30) Foreign Application Priority Data
Jul. 1, 2014 (GB) .................................. 1411694.1

(51) Int. Cl.
| G01N 35/00 | (2006.01) |
| G01P 5/02 | (2006.01) |
| H05B 37/03 | (2006.01) |
| G01P 15/14 | (2013.01) |
| G01S 19/01 | (2010.01) |
| G08C 17/02 | (2006.01) |

(52) U.S. Cl.
CPC ............... *G01P 5/02* (2013.01); *G01P 15/14* (2013.01); *G01S 19/01* (2013.01); *G08C 17/02* (2013.01); *H05B 37/03* (2013.01)

(58) Field of Classification Search
CPC .......................... G01N 33/54373; G01P 5/02
See application file for complete search history.

(56) References Cited

U.S. PATENT DOCUMENTS

| 2005/0011249 A1* | 1/2005 | Mahaffey ............... G01M 7/08 73/12.01 |
| 2009/0034258 A1 | 2/2009 | Tsai et al. |
| 2010/0033345 A1* | 2/2010 | Polk ....................... H04L 12/66 340/870.01 |
| 2010/0271199 A1 | 10/2010 | Belov et al. |
| 2012/0271603 A1* | 10/2012 | Lee ....................... G01M 7/022 703/6 |
| 2013/0217598 A1* | 8/2013 | Ludwig ............ G01N 33/54373 506/16 |
| 2014/0211487 A1 | 7/2014 | Spiro |
| 2014/0278150 A1 | 9/2014 | Baesler et al. |

FOREIGN PATENT DOCUMENTS

| CN | 202364425 U | 8/2012 |
| CN | 202647515 U | 1/2013 |
| CN | 102944889 A | 2/2013 |
| CN | 203673783 U | 6/2014 |
| CN | 203884050 U | 10/2014 |
| GB | 2498793 A | 7/2013 |
| JP | 2004125776 A | 4/2004 |
| KR | 20090108967 A | 10/2009 |
| KR | 101040215 B1 | 6/2011 |
| KR | 20120093741 A | 8/2012 |
| WO | 2009131389 A2 | 10/2009 |
| WO | 11142516 A | 11/2011 |
| WO | 2011149974 A1 | 12/2011 |
| WO | 13007382 A | 1/2013 |
| WO | 14078907 A | 5/2014 |
| WO | 15022213 A | 2/2015 |
| WO | 2015077297 A1 | 5/2015 |
| WO | 2015077626 A1 | 5/2015 |

* cited by examiner

*Primary Examiner* — Jewel V Thompson

(74) *Attorney, Agent, or Firm* — Aeon Law PLLC; Adam L. K. Philipp; Manasi Vakil

(57) ABSTRACT

A method and apparatus for monitoring the structural health of a stock of columns such as lighting columns and/or columns within that stock each of which is connected to receive power from an external source or otherwise. The method comprises the steps of locating on an upper surface of each or a plurality of columns within the stock to be monitored a micro controller connected to receive power from the electrical source of the respective column. The micro controller includes an electronic chip or board which includes, in circuit, an accelerometer, a Wi-Fi/RF or 3G/4G component or the like and a global positioning system (GPS) component or the like. The micro controller is operable to detect and monitor the magnitude and direction of forces imposed on the respective column and the direction from which such forces are derived, and to transmit the received data to a remote server for analysis.

12 Claims, No Drawings

MONITORING THE STRUCTURAL HEALTH OF COLUMNS

FIELD OF INVENTION

The present invention relates to a method for monitoring the structural health of a stock of columns such as lighting columns and/or columns within that stock. The present invention also relates to apparatus for monitoring the structural health of a stock of columns such as lighting columns and/or columns within that stock. The term "lighting columns" includes "lighting poles" and other similar structures.

By "stock" is meant a plurality of lighting columns or the like located together in a specific geographical location or area and subject to the same or similar climatic conditions. This definition includes a plurality of lighting columns or the like within an administrative area.

BACKGROUND TO THE INVENTION

Local Authorities and Highways Agencies routinely test their lighting column stock to check the stock's ability to withstand wind loads and/or loss of wall section due to, for example, corrosion.

Such tests are currently carried out using several methods. These include applying an artificial load to a column and measuring deflection, ultrasonic measurement of the wall section of a column and systems using eddy currents to determine the level of corrosion and resulting loss of wall section.

Examples of these methods are disclosed in WO2011/142516A, US2014/0211487A, WO2014/078907A, WO2015/022213A, WO2013/007382A and JP2004125776A.

Whereas these and other currently available methods may be able to provide accurate data and forecasted serviceable lifespans, there are, however, several major disadvantages to these and other known methods.

One such disadvantage is that in all existing systems known to the Applicants there is required a decision to be made concerning the number of columns within a stock to be tested and to what frequency that testing should be undertaken. Testing programs that are set up employing such systems are inevitably not able to take into account localised wind loads or ground conditions.

Although column manufacturers are required to provide a minimum design life of twenty five years there are numerous cases where the column's serviceable life is far less, due to column design and/or localised conditions that are more aggressive than otherwise anticipated.

It can also be the case that the actual installed age of a column is not documented which means that a could be past its projected design life.

Due to years of underfunding in infrastructure, stocks of lighting columns have frequently been found to include significant numbers of columns that are past their design life and therefore need to be tested to ensure they are structurally safe within the public domain. Unfortunately there have been cases of catastrophic failure, some of which have caused injury and even death.

A further disadvantage of known testing methods is that these generally require an operative to visit the installation and verify the structural health of a column. This can be a costly exercise in terms of testing administration and road traffic management. There is also an increase in risk to operatives while testing is carried out. This is particularly the case where the testing site in a hazardous location such as, for example, on central reservations of motorways.

The present invention seeks to provide inter alia an improved method and apparatus for monitoring the structural health of a stock of lighting or like columns that overcomes or at least alleviates problems associated with known methods and apparatus by providing monitoring equipment for location on and for connection to the power source of one or a plurality of columns of a stock of such columns, said monitoring equipment being operable to capture data relevant to the structural health of the columns being monitored and to transmit said data in real time to a remote server for analysis by bespoke software.

SUMMARY OF THE INVENTION

In one aspect the invention provides a method for monitoring the structural health of a stock of columns such as lighting columns and/or columns within that stock each of which is connected to receive power from an external source or otherwise, the method comprising the steps of locating on an upper surface of each or a plurality of columns within the stock to be monitored a micro controller connected to receive power from a source, the micro controller including an electronic chip or board which includes, in circuit, an accelerometer, a wireless transmitter component, a global positioning component and/or a real time clock component, the micro controller being operable to detect and monitor the magnitude and direction of forces imposed on the respective column and the direction from which such forces are derived, and to transmit the received data to a remote server for analysis.

The wireless transmitter is preferably a WI-FI/RF transmitter or a 3G/4G component.

The global positioning component is preferably a GPS component.

The micro controller may also include a gyroscope component.

The micro controller may also include in circuit an electrical surge protector.

Anemometers may be positioned on an upper surface of each or a plurality of columns within the stock, each such anemometer being connected through the micro controller to enable measurements of wind velocity and direction to be transmitted to the remote server.

In another aspect, the invention provides apparatus for measuring the structural health of a stock of columns such as lighting columns and/or columns within that stock, the apparatus comprising a micro controller for location on an upper surface of each of a plurality of columns within the stock to be monitored and connectable to a power supply, the micro controller including an electronic chip or board which includes in circuit an accelerometer, a wireless transmitter and a global positioning component and/or a real time clock component, the micro controller being programmed to detect and monitor data recording the magnitude and direction and effect of forces imposed on the column on which the micro controller is to be mounted and to transmit the received data to a remote server for analysis.

The micro controller may also include in circuit a gyroscope component and/or a power surge protector.

Anemometers may be positioned on an upper surface of one or each of a plurality of columns within the stock, the or each such anemometer being connected through the micro controller to enable measurements of wind velocity and direction to be additionally transmitted to the remote server.

DETAILED DESCRIPTION OF PREFERRED EMBODIMENTS

In one preferred method in accordance with the invention, the monitoring apparatus comprises a micro controller located on an upper surface of each lighting column whose structural health is to be monitored.

Each micro controller is powered by the electrical supply to the lighting column on which it is located and comprises an electronic chip or board which includes, in circuit, an accelerometer, a wireless transmitter such as a Wi-Fi/RF component and/or a 3G/4G component, a global positioning sensor (GPS) component and/or a real time clock component, a gyroscope component and an electronic surge protector.

The monitoring apparatus also includes an array of anemometers mounted on one or more columns of the stock to measure wind velocity and direction. This array of anemometers is also powered by the electrical supply to the lighting columns on which they are located.

The accelerometer is employed to detect and monitor inter alia the magnitude and direction of vibrational forces imposed on the column during, for example, periods of high winds, and column motions caused by dynamic loading imposed by such forces.

The gyroscope component is employed to detect movements or deflections of the upper section of the respective column away from its normal vertical position and the directions of these movements. Thus, the gyroscope component will provide the angular rate of movements or deflections of inspected columns in the X, Y and Z directions in degrees. From this data accelerations in the X, Y and Z directions can be calculated.

The WI-FI/RF component is provided to transmit data received by the monitoring system or hub to a remote server for analysis and the accelerometer component provides a measure of the direction from which forces imposed on the column are derived.

Data captured from the monitoring equipment is despatched by the WI-FI/RF components of the column stock to a central data hub. The collected data is then transmitted to a remote server for analysis using a bespoke software package. In this way the structural health of a stock of columns such as lighting columns can be continuously or periodically assessed and remedial action can then be taken should one or more of the column stock be found from the collected data to be in need of repair or replacement.

In this preferred arrangement the anemometers are secured to selected columns in positions which together provide substantially a 360 degree range of directions around the column stock.

Anemometers may be provided on every column of a column stock to be monitored, or may, alternatively, be located on a single column or a selected few columns within a group on the basis that wind velocity and wind direction are generally similar in each geographical location and measurements from a single structure may be taken to apply to a group of columns.

This wind data is then captured by the central monitoring system or hub and transmitted by the WI-FI/RF component to the remote server.

It is to be understood that the electronic chip or board may be manufactured using several different product platforms. Thus an electronic board may be attached to the lighting CMS (Central Management System) module or may be formed as a separate module attached to the electronic board of the lamp or lantern of the lighting column.

In both cases the platforms are constructed to fit inside or closely adjacent to the lamp or lantern of the columns and utilise the lamp or lantern power source.

Further component options include a separate module fitted on the upper surface of the lamp or lantern, again utilising the lamp or lantern power source, or a separate module fitted on the upper surface of the structure.

The WI-FI/RF component is preferably operable to send real time data to the remote server. An alternative to a WI-FI/RF component is a 3G/4G component.

Data collected by the remote server will include, for example, the date and time of the data capture, the geographical position of the column and/or column stock from which the collected data originated, the elevation above sea level of the lighting column stock from which the data was collected, data relating to individual column identification, and the speed and direction of acceleration of the measured stock under measured wind loads.

In the arrangement described, all of the captured data is sent to and held within a remote server where relevant data or extracts of the data can be viewed by authorised personnel through bespoke software.

The structural deflection of the monitored columns during known wind loads is calculated through the data captured by the accelerometer. Thus, acceleration data received may be integrated twice to provide deflection measurements in the X and Y axes. The deflection can then be analysed against specific structural calculations for each column type.

An alert function may be provided to indicate that one or more columns of a stock is/are in an unsafe condition. This function may be predictive to indicate that one or more columns of a stock is/are likely to become unsafe within a predicted period of time.

It is standard practice throughout the global industry to assess the capacity of a structure by using wind load codes and maps. The structural calculations are then governed by the amount of deflection that occurs which is directly related to the wind speed. It is possible, with this real time data, to verify that the structure is serviceable and even to predict other failure modes such as fatigue life.

The bespoke software is designed so that at any point in time, a column's structural integrity can be interrogated, as well as routinely capturing data on a frequency determined by authorised personnel. Certain structural parameters will be included so that authorised personnel are able to receive a warning if the structure deflects outside the normal operating range.

This can be used to indicate if, for example, a column is involved in a road traffic accident or suffers a catastrophic structural failure. Additional safety benefits are provided as the relevant authorities are able to respond quickly to a possible obstruction in the road through a warning alert transmitted by the monitoring apparatus, as opposed to waiting to receive a report from a passer by.

The software may also be linked to a Local Authority's Asset Register thereby to provide historical data regarding the structural outputs from the monitoring method and apparatus of this invention.

It is to be appreciated that the foregoing is merely indicative of methods and apparatus in accordance with the invention for monitoring the structural health of columns and stocks of columns and that modifications can readily be made thereto without departing from the scope of the invention as defined by the appended claims. Thus, whereas the invention has been described with particular reference to lighting columns and stocks of such columns, the invention has equal relevance to other species of columns and column stocks including telecom masts, railway signals, power distribution masts, pylons and the like.

The invention claimed is:

1. A method for monitoring the structural health of a stock of columns, such as lighting columns and/or columns within that stock, each of which is connected to receive power from an external source, the method comprising: locating a micro controller on an upper surface of each column or a plurality of columns, within the stock to be monitored, the micro controller connected to receive power from the external source of the respective column, the micro controller including an electronic chip or board which includes, in circuit, an accelerometer, a wireless transmitter, and a global positioning component and/or a real time clock component, the micro controller being operable to detect and monitor the magnitude and direction of forces imposed on the respective column and the direction from which such forces are derived, and to transmit the received data to a remote server for analysis.

2. The method as claimed in claim 1 wherein the wireless transmitter is a WI-FI/RF or 3G/4G component.

3. The method as claimed in claim 1, wherein the global positioning component is a GPS component.

4. The method as claimed in claim 1, wherein the micro controller also includes a gyroscope component.

5. The method as claimed in claim 1, wherein the micro controller also includes in circuit an electrical surge protector.

6. The method as claimed in claim 1, wherein anemometers are positioned on an upper surface, of each column or a plurality of columns, within the stock, each such anemometer being connected through the micro controller to enable measurements of wind velocity and direction to be transmitted to the remote server.

7. Apparatus for measuring the structural health of a stock of columns such as lighting columns each connected to receive a supply of power and/or columns within that stock, the apparatus comprising:

a micro controller for location on an upper surface of each of a plurality of columns within the stock to be monitored and connectable to the power supply for those columns, the micro controller including an electronic chip or board which includes in circuit an accelerometer, a wireless transmitter and a global positioning component, the micro controller being programmed to detect and monitor data recording the magnitude and direction and effect of forces imposed on the column on which the micro controller is to be mounted and to transmit the received data to a remote server for analysis.

8. The apparatus as claimed in claim 7 wherein the wireless transmitter is a WI-FI/RF or 3G/4G transmitter.

9. The apparatus as claimed in claim 7 wherein the global positioning component is a GPS component.

10. The apparatus as claimed in claim 7 wherein the micro controller also includes a gyroscope component.

11. The apparatus as claimed in claim 7 wherein the micro controller also includes in circuit a power surge protector.

12. The apparatus as claimed in claim 7 wherein anemometers are positioned on an upper surface of each column or a plurality of columns within the stock, each such anemometer being connected through the micro controller to enable measurements of wind velocity and direction to be transmitted to the remote server.

* * * * *